United States Patent [19]

Oehlert et al.

[11] Patent Number: 5,665,157
[45] Date of Patent: Sep. 9, 1997

[54] CLEAN COLOR SHADE, YELLOW-TINGED RED IRON OXIDE PIGMENTS, AND A PROCESS FOR THEIR MANUFACTURE, AND THEIR USE

[75] Inventors: Wolfgang Oehlert; Wilfried Burow, both of Krefeld; Horst Brunn, Meerbusch; Herbert Kunstmann, Krefeld, all of Germany

[73] Assignee: Bayer AG, Leverkusen, Germany

[21] Appl. No.: 730,088

[22] Filed: Oct. 15, 1996

[30] Foreign Application Priority Data

Oct. 26, 1995 [DE] Germany .................. 195 39 900.5
Jun. 24, 1996 [DE] Germany .................. 196 25 092.7

[51] Int. Cl.⁶ .................................................. C09C 1/22
[52] U.S. Cl. .................................................. 106/456
[58] Field of Search .................................... 106/456

[56] References Cited

U.S. PATENT DOCUMENTS

| | | | |
|---|---|---|---|
| 4,234,348 | 11/1980 | Brunn et al. | 106/304 |
| 4,676,838 | 6/1987 | Franz et al. | 106/304 |
| 5,269,843 | 12/1993 | Kunstmann et al. | 106/459 |

FOREIGN PATENT DOCUMENTS

| | | |
|---|---|---|
| 143 517 | 2/1902 | Germany . |
| 463 773 | 5/1925 | Germany . |
| 464 561 | 5/1925 | Germany . |
| 515 758 | 8/1925 | Germany . |
| 516 999 | 8/1925 | Germany . |
| 518 929 | 8/1925 | Germany . |
| 551 254 | 12/1930 | Germany . |
| 551 255 | 12/1930 | Germany . |
| 1 191 063 | 4/1965 | Germany . |
| 24 14 805 | 10/1975 | Germany . |

OTHER PUBLICATIONS

"Pigment Handbook", T.C. Patton, New York, London 1973, p. 333.
"Industrial Minerals and Rocks", New York, 1975, p. 355.

*Primary Examiner*—Deborah Jones
*Assistant Examiner*—Amy M. Harding
*Attorney, Agent, or Firm*—Connolly and Hutz

[57] ABSTRACT

The invention relates to clean color shade, yellow-tinged red iron oxide pigments, and a process for their manufacture, and their use.

15 Claims, No Drawings

CLEAN COLOR SHADE, YELLOW-TINGED RED IRON OXIDE PIGMENTS, AND A PROCESS FOR THEIR MANUFACTURE, AND THEIR USE

The invention relates to clean color shade, yellow-tinged red iron oxide pigments, and a process for their manufacture and their use.

Iron oxide coloring pigments, which are used in ceramics, construction industry materials, plastics and coatings (lacquers and paints) as environmentally safe coloring agents are principially available in shades of yellow, brown, black and red. The main field of application for iron oxide coloring pigments is the construction industry materials sector where red iron oxide coloring pigments in particular, are used to dye roof tiles, clinker bricks etc.

As described on p. 333 of "Pigment Handbook" by T. C. Patton, New York, London 1973, red iron oxide pigments are manufactured by roasting ferrous sulphate, by dehydrating yellow iron oxide, by direct precipitation of red iron oxide or by oxidation of black iron oxide. Clean color shade, yellow-tinged red pigments can be obtained by roasting ferrous sulphate, dehydrating yellow iron oxide or direct precipitation of red iron oxide. Annealing and oxidation of black iron oxide produces only low chroma red iron oxide pigments with inadequate yellow tinge.

The above-mentioned processes for producing clean color shade, yellow-tinged red pigments do, however, have economic and environmental disadvantages. The production of red pigments by dehydrating and roasting ferrous sulphate is a complex, high cost, multi-stage process which generates waste water containing heavy metals. The production of red iron oxide by dehydration of yellow iron oxide is also unsatisfactory in terms of cost as the yellow iron oxide precursor has to be produced in a time-consuming process in an aqueous medium at low pH. The needle-shaped yellow iron oxide which is difficult to dehydrate mechanically has to be thermally dehydrated at high drying costs. Because of its anisotropic particle shape derived from the needle-shaped precursor the resulting red iron oxide is sensitive to grinding.

It is also unsatisfactory in terms of cost to produce red iron oxide by direct precipitation since the pigment synthesis, which takes place in an acid to neutral medium, only permits low space/time yields. Direct red pigments produced in this way by precipitation also have high arsenic and antimony contents, as described in "Industrial Minerals and Rocks", New York 1975, p. 355, Table 8. Due to incorporating water during the pigment formation process in the direct precipitation of red iron oxide pigments, these pigments also have a high loss on ignition (approx. 2%) limiting the use of these pigments in certain applications (fibre cement, granulated sand). The loss of the incorporated water in high temperature applications (approx. 400°–1000° C.) is associated with a loss of the clean color shade and the yellow tinge of these directly precipitated red iron oxide pigments. Furthermore, directly precipitated red iron oxide pigments are very sensitive to grinding, which can lead to undesired shade changes in the dispersion process in construction industry materials applications.

It is known that black iron oxide with high space/time yields can be obtained as a favourable precursor for red iron oxide pigments by reacting iron raw materials such as iron filings, with nitrobenzene in an acid medium. The high space/time yields obtained when producing black iron oxide by the reduction process are not possible with the other processes for producing black iron oxide. No further energy needs to be supplied to the exothermic process of black iron oxide formation, and moreover, no stoichiometric quantities of salts—such as sodium sulphate—occur when the pigment forms, which illustrates the economic and environmental advantages of this reduction process.

It is also known that in the reaction process between nitrobenzene and iron raw materials the properties of the desired pigments can only be controlled by a few additives:
Addition of zinc (DE 143 517)
Addition of NaCl, $CaCl_2$, $MgCl_2$ (DE 463 773)
Addition of aluminium salt, aluminium metal (DE 515 758)
Addition of tri- or tetravalent metals (DE 516 999)
Addition of aqueous suspensions of tri- or tetravalent metal oxides and/or hydroxides (DE 518 929)
Addition of Pb compounds (DE 551 254)
Addition of $H_3PO_4$ (DE 551 255)
Addition of Sn salts (DE 1 191 063)
Addition of Na, K, $NH_4$, Mg and Ca salts of sulphurous, thiosulphurous, thiosulphuric, dithionous, dithionic and pyrosulphuric acid (DE 2 414 805)
Addition of Al salts, aluminate, NaOH for post-treatment (DE 2 826 941)
Addition of boric acid and boron compounds (DE 4 135 742).

The addition of these so-called control chemicals in the reaction process does not, however, lead to black iron oxide which is suitable as a precursor for producing clean color shade, yellow-tinged red iron oxide pigments. The use of $H_2SO_4$ or phosphorus compounds—particularly $H_3PO_4$—in quantities of 0 to 900 ppm of phosphorus in relation to metallic iron used, leads to a black iron oxide that is only suitable as a precursor for traditional low chroma red iron oxide pigments with inadequate yellow tinge. Too high quantities of $H_2SO_4$ have no effect, and high quantities of $H_3PO_4$—with contents>10,000 ppm of phosphorus in relation to metallic iron used—do not lead to black iron oxide but to undesired brown iron oxide (mixture of $Fe_3O_4$, $\alpha$-FeOOH and $\alpha$-$Fe_2O_3$, DE 551 255). Annealing these brown iron oxide pigments produces undesirable dark, low chroma, blue-tinged red iron oxide pigments.

The precipitation of Al compounds onto black iron oxide pastes produces black pigments which lead to bright and high chroma red iron oxide pigments after annealing (DE 2 826 941). Only clean color shade red pigments for masstone applications in the coatings (lacquer and paints) sector are obtained via this process; yellow-tinged red pigments for coloring construction industry materials (tile red shades) or for blending applications with white pigments are not obtained.

The object is to provide improved red iron oxide pigments which lead to clean color shade, yellow-tinged aesthetic tile red shades in both construction industry materials applications and blending applications with white pigments not having the prior art disadvantages (roasting of iron sulphate, dehydration of yellow iron oxide or direct precipitation of red iron oxide), and to provide an economically and environmentally acceptable process for producing them.

Surprisingly it has been found that the desired red iron oxide pigments can be produced by calcination of a black iron oxide paste from a modified nitrobenzene reduction process. The red iron oxide pigments have a loss on ignition of less than 1 wt. % and a phosphorus content of 0.13 to 0.50 wt. % and are surprisingly stable to grinding, have a clean color shade and are yellow-tinged.

The invention provides clean color shade, yellow-tinged red iron oxide pigments which have a loss on ignition of less than 1 wt. % and a phosphorus content of 0.13 to 0.50 wt. %, preferably 0.13 to 0.30 wt. %, and a lightness value (L*)

of 50–60 CIELAB units, preferably 52–56 CIELAB units, a color chroma (C*) of more than 43.5 CIELAB units, preferably more than 44 CIELAB units, and a red value (a*) of more than 25 CIELAB units, preferably more than 28 CIELAB units and a yellow value (b*) of more than 25 CIELAB units, preferably more than 29 CIELAB units as measured in a barite pellet.

The red iron oxide pigments according to the invention are stable to grinding.

A further object of this invention is a process for producing the clean color shade, yellow-tinged red iron oxide pigments in accordance with this invention by calcination of magnetite, which is characterized in that the magnetite is produced by oxidation of iron with nitrobenzene in an acid medium in the presence of phosphorus compounds, wherein the quantity of phosphorus used in relation to the quantity of metallic iron, is 1000 to 5000 ppm, preferably 1000 to 3000 ppm.

Surprisingly, clean color shade, yellow-tinged red iron oxide pigments according to the present invention are obtained although the use of phosphoric acid in prior art has resulted in inadequate pigments.

Phosphates are preferably used as phosphorus compounds, with phosphoric acids, such as $H_3PO_4$ being particularly preferred.

The red iron oxide pigments according to the invention are preferably used for coloring construction industry materials, coatings (lacquers and paints), plastics, paper and ceramics in the form of powdered pigments, low-dust granules, pastes and slurries. They are also used as an advantageous constituent for brown iron oxide pigments.

Brown iron oxide pigments are chiefly produced by blending black, red and yellow iron oxides. For example, light, yellow-tinged brown iron oxide pigments contain needleshaped yellow iron oxide, in the amount of 10–75 wt. %. Because of its coloring properties, the yellow iron oxide content has only a very small contribution to the overall color intensity (tint strength) of brown iron oxide pigments. Furthermore, the needle-shaped yellow iron oxide content leads to problems during the liquefaction of the brown blends, so that only low solid contents can be set in slurries. By using the clean color shade, yellow-tinged red iron oxide pigments according to the invention to manufacture light, yellow-tinged brown blends, the required yellow iron oxide content can be reduced or eliminated, so that high tint strength, easily liquefiable brown iron oxide pigments are obtained by using the clean color shade, yellow-tinged red iron oxide pigments according to the invention. The person skilled in the art can easily determine the extent of the yellow-tinged red iron oxide pigments required as a substitute for the yellow iron oxide in setting the desired color values of the brown blends.

The red iron oxide pigments according to the invention can therefore also preferably be used in the manufacture of high tint strength, easily liquefiable brown iron oxide pigments.

The invention is described in greater detail below with the aid of the following examples.

The CIELAB color values (L*, a*, b* and C*) of the pigments produced according to the invention and of the pigments of the comparative examples are determined in accordance with DIN 53237, in which a test procedure is described for determining the suitability of pigments for coloring cement- and lime-containing construction industry materials. The test method described in DIN 53237 was modified as described below to allow for quantification and reproducibility of the color values measurements.

0.500 g of each pigment to be tested are introduced, together with 10.00 g of barite ($BaSO_4$), into a shaking glass with a capacity of 250 cm$^3$. The barite ($BaSO_4$) used as the binder is characterised as follows:

| "Barytmehl F" (ground barite): | a trade product of "Sachtleben GmbH", Duisburg |
|---|---|
| total moisture content: | <0.5% |
| particle size distribution: | average value of the volume distribution: 9 μm |
| | 10% of the volume distribution falls below: 1 μm |
| | 90% of the volume distribution falls below: 21 μm |

After adding 200 new-grade steel balls (ball bearings) having a diameter of 5 mm to the shaking glass filled with the pigment/barite mixture the glass is shaken for 300 seconds with an automatic bench rotary shaker at a frequency of 400 min$^{-1}$ and a shaking circle diameter of 25 mm. Then the pigment/barite mixture is separated from the steel balls by means of a sieve and tested for its homogeneity by drawing down the pigment/barite mixture onto a rough piece of paper. Shaking is continued until minute pigment lumps (specks) have disappeared.

A non-coloring binder material (such as for example cement) is added to the pigment/barite mixture without further mixing and compacted to form a cylindrical body with a diameter of 40 mm and a height of about 4 mm in a commercially available hydraulic laboratory compactor using a pressure of 120 bars on the pellet and a retention time of 5 seconds.

The resulting barite pellets are then analysed in a commercially available color analysing device of d/8° geometry (Ulbricht sphere). The reflection factors obtained are converted into the CIELAB color data system by the standard method in accordance with ASTM E 308-85 and DIN 6174 (ISO 7724/3, 1984; ASTM D 2244-85) using a C/2° standard illuminant, with the inclusion of surface reflection, C* being defined as the square root of the sum of the squares of a* and b* $[C^*=(a^{*2}+b^{*2})^{1/2}]$.

The reproducibility of the method of preparation and analysis was examined over a period of four years using samples of the iron oxide red pigment Bayferrox® 110 (Standard 1988, a trade product of Bayer AG). The following table shows the individual CIELAB color values L*, a*, b* and C* and the corresponding average values and standard deviations:

| Reproducibility of the barite pellet color determination method | | | | |
|---|---|---|---|---|
| Sample | L* | a* | b* | C* |
| 1 | 52.8 | 31.0 | 27.9 | 41.7 |
| 2 | 52.6 | 31.0 | 27.9 | 41.7 |
| 3 | 52.6 | 31.1 | 28.0 | 41.9 |
| 4 | 52.0 | 30.9 | 27.5 | 41.4 |
| Average value | 52.5 | 31.0 | 27.8 | 41.7 |
| Standard deviation | 0.3 | 0.1 | 0.2 | 0.2 |

The table shows that, when determining the CIELAB color values of a pigment barite pellet an uncertainty factor of 0.1–0.3 units in the corresponding color values L* (lightness), a* (red value), b* (yellow value) and C* (chroma) must be taken into account.

EXAMPLES

The examples below serve to describe the production process for producing the clean color shade, yellow-tinged red iron oxide pigments according to the invention by way of example, wherein the person skilled in the art can vary the process according to need as regards the choice of technical equipment or raw materials used. Iron oxide pigments which are obtained by reacting iron raw materials with nitrobenzene are produced according to the Laux process which is described in patents DE 463 773 and DE 464 561. On the basis of the process described therein, the following raw materials are chemically reacted in pressure-resistant tanks equipped with agitators:

Comparative examples:

The washing water is decanted off and the paste again slurried with drinking water.

Decanting and washing takes place until the conductivity of the washing water reaches that of the drinking water (=salt-free).

Filtration:

A Buchner funnel with filter paper is placed on an aspirator. The filter paper is carefully moistened with drinking water and spread smoothly on the Buchner funnel.

| Parameters | | Comparative example 1 (=> 538 ppm P/Fe°) | Comparative example 2 (=> 772 ppm P/Fe°) | Comparative example 3 (=> 725 ppm P/Fe°) | Comparative example 4 (=> 888 ppm P/Fe°) | Comparative example 5 (DRP 551255) (=> 13510 ppm P/Fe°) |
|---|---|---|---|---|---|---|
| Phase 1 | $FeCl_2$-soltuion/(I) | 5.75 | 5.966 | 4500 | 5.75 | 0.3 |
| | $H_2O$/(I) | 0.992 | 0.756 | 800 | 0.992 | 0.45 |
| | $H_2SO_4$ (96%)/(I) | 0.24 | 0.24 | 180 | 0.24 | 0 |
| | $H_3PO_4$/(I) | 0.023 (85%) | 0.033 (85%) | 28 (75%) | 0.038 (85%) | 17.6 (85%) |
| | Iron/(kg) | 13.34 | 13.34 | 10000 | 13.34 | 0.6 |
| | Nitrobenzene/(I) | 0.67 | 0.67 | 500 | 0.67 | 0 |
| Phase 2 | Iron/(kg) | 8 | 8 | 6400 | 8 | |
| | Nitrobenzene/(I) | 12.67 | 12.67 | 10000 | 12.67 | 0.5 |
| | $H_2O$/(I) | 9.330 | 9.330 | 7000 | 9.330 | |

Examples:

| Parameters | | Example 1 (=> 1005 ppm P/Fe°) | Example 2 (=> 1573 ppm P/Fe°) | Example 3 (=> 1763 ppm P/Fe°) |
|---|---|---|---|---|
| Phase 1 | $FeCl_2$-soltuion/(I) | 5.968 | 4800 | 4800 |
| | $H_2O$/(I) | 0.756 | 800 | 800 |
| | $H_2SO_4$ (96%)/(I) | 0.24 | 185 | 185 |
| | $H_3PO_4$/(I) | 0.043 (85%) | 60 (75%) | 60 (75%) |
| | Iron/(kg) | 13.34 | 11000 | 11000 |
| | Nitrobenzene/(I) | 0.67 | 500 | 500 |
| Phase 2 | Iron/(kg) | 8 | 4800 | 3100 |
| | Nitrobenzene/(I) | 12.67 | 8250 | 7400 |
| | $H_2O$/(I) | 9.330 | 7000 | 6000 |

| Parameters | | Example 4 (=> 1768 ppm P/Fe°) | Example 5 (=> 1835 ppm P/Fe°) | Example 6 (=> 1946 ppm P/Fe°) |
|---|---|---|---|---|
| Phase 1 | $FeCl_2$-solution/(I) | 4800 | 4800 | 4800 |
| | $H_2O$/(I) | 800 | 800 | 800 |
| | $H_2SO_4$ (96%)/(I) | 185 | 185 | 185 |
| | $H_3PO_4$/(I) | 70 (75%) | 66 (75%) | 70 (75%) |
| | Iron/(kg) | 11000 | 11000 | 11000 |
| | Nitrobenzene/(I) | 500 | 500 | 500 |
| Phase 2 | Iron/(kg) | 5400 | 3900 | 3900 |
| | Nitrobenzene/(I) | 8700 | 7900 | 7900 |
| | $H_2O$/(I) | 7000 | 7000 | 7000 |

In all cases the black pastes obtained are further processed as described below (washing, annealing/calcination and grinding):

Washing:

200–250 g of paste (with as little an aqueous phase as possible) are slurried with drinking water in a 2 litre flask (shake vigorously).

To separate out the residual iron/coarse particles, the suspension is passed through a 40 μm sieve screen into a 10 liters beaker. Optionally the suspension can be brushed through the sieve screen with the aid of a round brush.

The suspension is slurried with drinking water and allowed to settle out; for support and to aid the settling process the beaker is placed on a permanent magnet (utilizing the magnetic properties of black iron oxide).

The aspirator is connected to a vacuum pump.

The pigment suspension is poured onto the Buchner funnel.

After aspiration the filter cake is turned over into an aluminium dish and the filter removed.

Annealing/Calcination:

The pigment paste is tempered in an aluminium dish in a drying oven for approx. 20 minutes at 240° C.

The tempered material is then pushed through a 2 mm sieve screen using a pestle.

10 g of the tempered material are weighed into a small alumina dish and placed in a laboratory muffle furnace preheated to 800° C.

After 15 minutes calcination time, the material is stirred vigorously for approx. 30 seconds with the aid of a stirring instrument.

The pigment is then calcined for a further 15 minutes.

The small alumina dish is removed from the furnace with the aid of the crucible tongs and placed on a heat-resistant Ceran plate to cool down.

In individual cases the ready black pigment dried at 105° C. can subsequently be tempered for 20 minutes at 240° C. and calcined in the laboratory muffle furnace as described above.

Grinding:

3.2 g each of the pigments produced according to the invention and the pigments of the comparative examples are ground for 60 seconds in a vibration ball mill of such as "Mikrodismembrator II" (Microdisintegrator II) from the B. Braun company, using a 10 mm steel ball (ball bearing). An oval rotational body ($r_1$=1.48 cm, $r_2$=2.03 cm) consisting of polyamide and having a volume of 18.5 cm$^3$ is used as the grinding chamber. The vibration amplitude of the approximate linear vibration in the direction of the longitudinal axis of the grinding chamber is 13 mm and the equilateral deflection is 6.5 mm. The vibration frequency is 50 Hz.

TABLE I:

Phosphorus contents and color data of the red iron oxide pigments according to the invention and of the comparative pigments.

| CIELAB-color values of calcined red iron oxide pigments in a barite pellet | | | | | | | |
|---|---|---|---|---|---|---|---|
| Example | ppm P/Fe° | L* | a* | b* | C* | % P in pigment | Loss on ignition |
| Comparative example 1 | 538 | 51.8 | 30.6 | 27.9 | 41.4 | 0.07 | <1% |
| Comparative example 2 | 772 | 52.2 | 30.2 | 27.6 | 40.9 | 0.10 | <1% |
| Comparative example 3 | 725 | 52.0 | 30.2 | 27.2 | 40.6 | 0.08 | <1% |
| Comparative example 4 | 888 | 51.8 | 30.2 | 28.6 | 41.6 | 0.10 | <1% |
| Comparative example 5 | 13510 | 63.1 | 9.8 | 6.7 | 11.9 | 0.09 | <1% |
| Example 1 | 1005 | 52.9 | 30.4 | 31.8 | 44.0 | 0.13 | <1% |
| Example 2 | 1573 | 57.5 | 28.5 | 34.7 | 44.9 | 0.15 | <1% |
| Example 3 | 1763 | 54.6 | 29.7 | 34.0 | 45.1 | 0.18 | <1% |
| Example 4 | 1768 | 55.2 | 29.8 | 34.9 | 45.9 | 0.14 | <1% |
| Example 5 | 1835 | 54.4 | 30.5 | 35.1 | 46.5 | 0.16 | <1% |
| Example 6 | 1946 | 54.9 | 30.2 | 36.1 | 47.1 | 0.20 | <1% |
| Roasted red |  | 52.2 | 31.4 | 28.7 | 42.5 | 0.05 | <1% |
| Directly precipitated red |  | 52–54 | 29–31 | 23–35 | 37–47 | 0.003 | >2% |

Table I contains the colorimetric data of a number of pigments according to the invention and the color values of a number of comparative pigments. The color chroma (C*) is the criterion for the clean color shade of the pigments, the yellow value (b*) the criterion for the yellow tinge.

What is claimed is:

1. A clean color shade, yellow-tinged red iron oxide pigment having a loss on ignition of less than about 1% by weight, a P content of 0.13 to 0.50% by weight, a lightness (L*) of 50–60 CIELAB units, a chroma (C*) of more than 43.5 CIELAB units, a red value (a*) of more than 25 CIELAB units, and a yellow value (b*) of more than 25 CIELAB units as measured in a barite pellet.

2. A red iron oxide pigment according to claim 1, wherein the P content is between 0.13 and 0.30% by weight.

3. A red iron oxide pigment according to claim 1, wherein the chroma (C*) in a barite pellet is greater than 44 CIELAB units.

4. A red iron oxide pigment according to claim 3 wherein the red value (a*) in a barite pellet is greater than 28 CIELAB units, and the yellow value (b*) in a barite pellet is greater than 29 CIELAB units.

5. A construction industry material dyed with a clean color shade, yellow-tinged red iron oxide pigment having a loss on ignition of less than about 1% by weight, a P content of 0.13 to 0.50% by weight, a lightness (L*) of 50–60 CIELAB units, a chroma (C*) of more than 43.5 CIELAB units, a red value (a*) of more than 25 CIELAB units, and a yellow value (b*) of more than 25 CIELAB units as measured in a barite pellet.

6. The pigment of claim 1, wherein the pigment is a paste, slurry or granules.

7. Brown iron oxide blends which contain a clean color shade, yellow-tinged red iron oxide pigment having a loss on ignition of less than about 1% by weight, a P content of 0.13 to 0.50% by weight, a lightness (L*) of 50–60 CIELAB units, a chroma (C*) of more than 43.5 CIELAB units, a red value (a*) of more than 25 CIELAB units, and a yellow value (b*) of more than 25 CIELAB units as measured in a barite pellet.

8. A process for producing a clean color shade, yellow-tinged red iron oxide pigment by calcination of magnetite, wherein the magnetite is produced by the oxidation of iron with nitrobenzene in an acid medium in the presence of phosphorous compounds, and the quantity of phosphorous used, relative to the quantity of metallic iron, is 1000–5000 ppm.

9. A process according to claim 8, wherein the quantity of phosphorous used is 1000 to 3000 ppm.

10. A process according to claim 8, wherein the clean color shade, yellow-tinged red iron oxide pigment has a P content of 0.13 to 0.50% by weight, a loss on ignition of less than about 1% by weight, a color chroma (C*) of more than 43.5 CIELAB units, a red value (a*) of more than 25 CIELAB units, and a yellow value (b*) of more than 25 CIELAB units in a barite pellet.

11. A process according to claim 10, wherein the color chroma (C*) is greater than 44 CIELAB units.

12. A process according to claim 11, wherein the red value (a*) of the red iron oxide pigment is greater than 28 CIELAB units, and the yellow value (b*) of the red iron oxide pigment is greater than 29 CIELAB units.

13. A process according to claim 8, wherein the phosphorous compound is a phosphate.

14. A process according to claim 8, wherein the phosphorous compound is a phosphoric acid.

15. A process according to claim 8, wherein the phosphorous compound is $H_3PO_4$.

* * * * *